No. 634,074. Patented Oct. 3, 1899.
D. E. VIRTUE & M. DEEG.
COMBINED CHURN AND BUTTER WORKER.
(Application filed May 19, 1898.)

(No Model.) 2 Sheets—Sheet 1.

Witnesses.
C. F. Kilgore
R. D. Merchant

Inventors
Dennis E. Virtue
Martin Deeg
By Their Attorney
Jas. F. Williamson

THE NORRIS PETERS CO., PHOTO-LITHO., WASHINGTON, D. C.

No. 634,074. Patented Oct. 3, 1899.
D. E. VIRTUE & M. DEEG.
COMBINED CHURN AND BUTTER WORKER.
(Application filed May 19, 1898.)
(No Model.) 2 Sheets—Sheet 2.
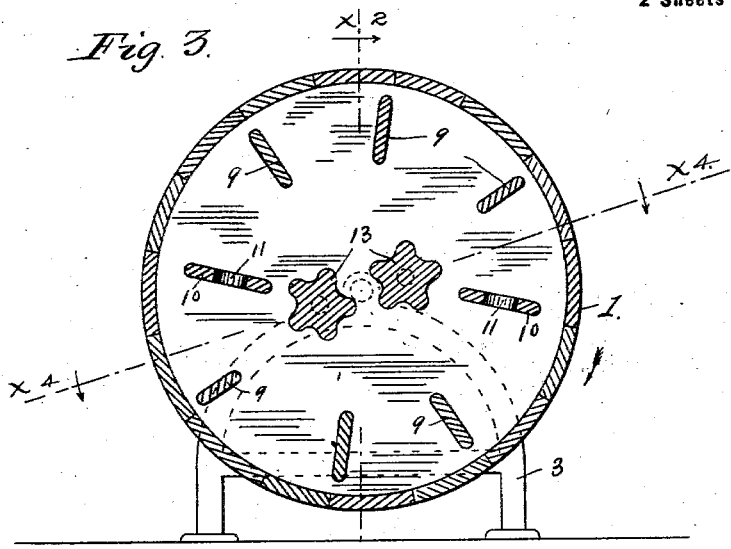
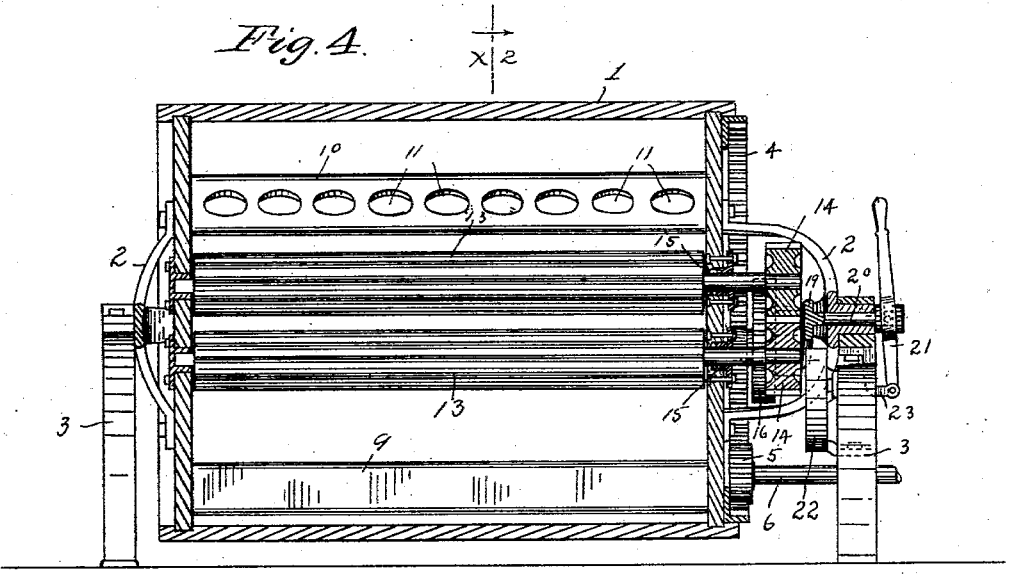
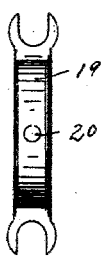
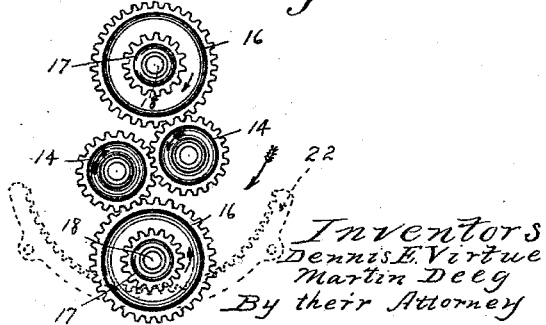
Witnesses
C. F. Kilgore
F. D. Merchant
Inventors
Dennis E. Virtue
Martin Deeg
By their Attorney
Jas. F. Williams

UNITED STATES PATENT OFFICE.

DENNIS E. VIRTUE AND MARTIN DEEG, OF OWATONNA, MINNESOTA.

COMBINED CHURN AND BUTTER-WORKER.

SPECIFICATION forming part of Letters Patent No. 634,074, dated October 3, 1899.

Application filed May 19, 1898. Serial No. 681,120. (No model.)

*To all whom it may concern:*

Be it known that we, DENNIS E. VIRTUE and MARTIN DEEG, citizens of the United States, residing at Owatonna, in the county of Steele and State of Minnesota, have invented certain new and useful Improvements in a Combined Churn and Butter-Worker; and we do hereby declare the following to be a full, clear, and exact description of the invention, such as will enable others skilled in the art to which it appertains to make and use the same.

Our invention relates to combined churns and butter-workers, and has for its object to provide an improved machine of this class.

To this end our invention consists of the novel devices and combinations of devices hereinafter described, and defined in the claims.

The invention is illustrated in the accompanying drawings, wherein like notations refer to like parts throughout the several views.

Figure 1:
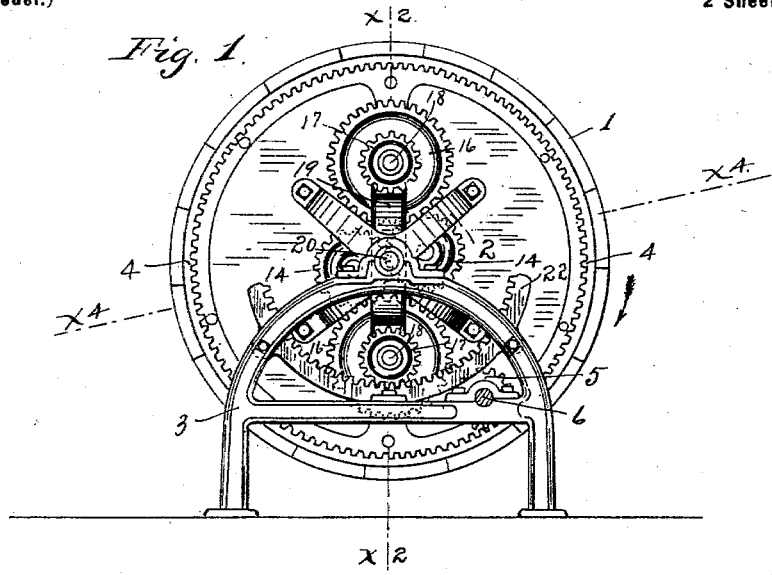
Figure 2:
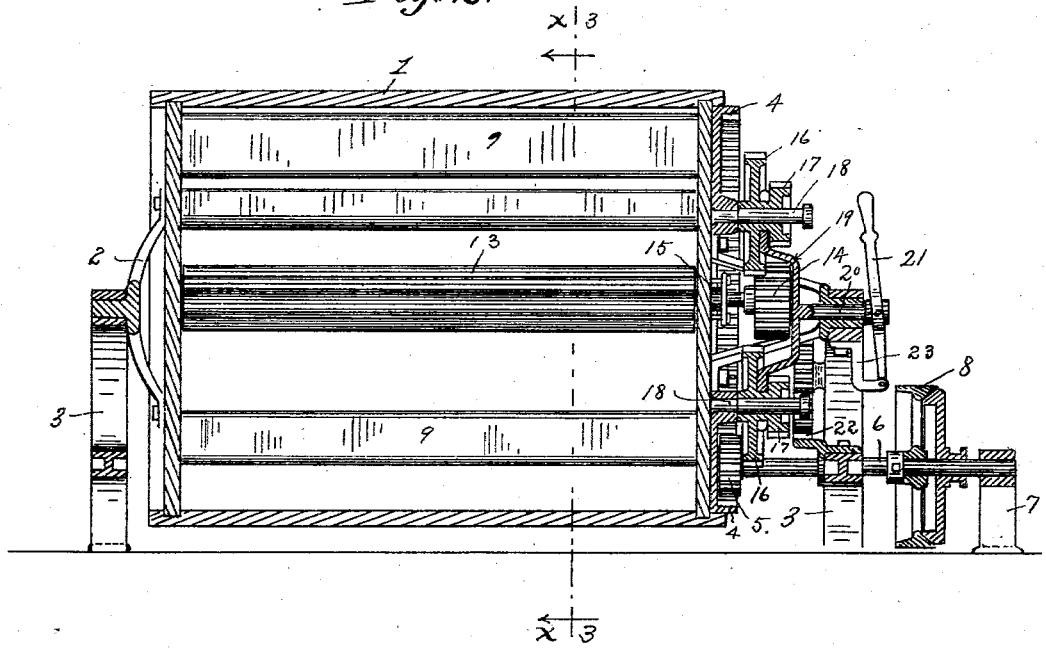

Figure 1 is an end elevation of our improved machine with some parts removed. Fig. 2 is a longitudinal vertical section through the same on the line $x^2$ $x^2$ of Fig. 1. Fig. 3 is a vertical cross-section on the line $x^3$ $x^3$ of Fig. 2. Fig. 4 is a section on the line $x^4$ $x^4$ of Fig. 1 when the drum is in position to bring the working rollers one directly over the other in the vertical plane. Fig. 5 is a detail showing the shipper-fork for the roller-drive detached, and Fig. 6 is an end view of the roller-drive with the other parts removed.

The drum 1 is mounted in any suitable way to receive rotary motion from any suitable drive. As shown, the drum-heads are provided with trunnion-spiders 2, the trunnions of which rest in suitable bearing-pedestals 3, fixed to the floor or other supporting-base. One of the trunnions—to wit, the right-hand member, as shown—is hollow for a purpose which will later appear. The drum-head facing the hollow trunnion is shown as provided with an internal gear-wheel 4, which is engaged by a pinion 5 on the inner end of the driving-shaft 6. The driving-shaft 6 is supported by the adjacent pedestal 3 for the drum and an outer end or shaft pedestal 7, as shown in Fig. 2. The said shaft 6 is provided with a friction-clutch driving-pulley 8, of the ordinary well-known construction, to which motion is imparted by a belt from any suitable source.

The drum 1 is provided on its interior with a series of beater-blades 9 and 10. Of these beater-blades the members 9 are narrower than the members 10 and are imperforate. The members 10 are wider than the members 9 and are provided with a series of holes 11. All of said beater-blades 9 and 10 are set radially inward from the shell of the drum, so as to leave clearance behind the same or, in other words, between the same and the concave cylindrical surface of the drum. The beater-blades are secured at their opposite ends to the drum-head. The perforated beater-blades 10 are arranged in pairs, which are substantially diametrically opposite to each other. Only a single pair of the perforated blades 10 are shown, while all the others are solid; but an additional pair of the perforated blades might be employed, if so desired. The drum is also provided on its interior with a pair of corrugated working rollers 13, journaled in the drum-heads. The journals of these rollers 13 extend outward at one end through the drum-head and are provided at their outer ends with pinions 14. The said journals of the rollers 13 pass outward through suitable stuffing-boxes 15 to preserve a tight joint. The pinions 14 on the working rollers 13 are respectively engaged each by one member of a pair of gears 16. These gears 16 are formed on a common hub with pinions 17. It will be convenient to call the wheels 16 and 17 the "double gears." These double gears are carried on stud-shafts 18, fixed to and projecting from the drum-head. As shown, the said stud-shafts 18 are fixed to the casting of the annular gear on the drum. The stud-shafts 18 are of a length to permit a sliding movement thereon of the said double gears and are shown as headed at their outer ends to limit the outward movement of the said double gears. The stud-shafts 18 and the double gears carried thereby are located diametrically opposite to each other and equidistant from the axis of the drum. The hubs of said double gears are engaged by the opposite forks of a shipper-head 19, having a central stem 20, which passes outward through the hollow trunnion of the drum and is engaged by a hand-lever 21, (shown as pivoted at its lower end to a bearing-lug 23,) projecting from the pedestal 3. Under the action of the hand-lever 21 it is obvious that the double gears may be shifted on their supporting stud-shafts 18. Throughout this shifting movement, however, the double-gear members 16 always remain in mesh with the roller-pinions 14, the latter having sufficient length of face for this purpose. When the double gears are in their outermost position, the pinion members 17 thereof will be in the proper plane to engage with a segmental rack 22, which is fixed to the pedestal 3, as best shown in Figs. 1, 2, and 6. When the double gears are shifted to their innermost position by the hand-lever 21, the pinion members 17 thereof will be in a proper plane to clear the fixed rack 22 under the rotary motion of the drum, as shown in Fig. 2. When the double gears are in their driving position, as shown in Figs. 1 and 6, it must be obvious that the pinion members 17 will engage with the fixed rack 22 in succession under the rotary motion of the drum. Hence at every shift from one to the other of said pinions 16 the motion of the working rollers 13 will be reversed. The fixed rack 22 is preferably very nearly equal to a half-circle. Sufficient clearance must be left to permit one pinion to pass off from the rack before the other engages with the same. The motion of the working rollers 13 is therefore reversed twice in each revolution of the drum. These reversings come at the right times to keep the working rollers turning toward each other throughout the time that the butter is being lifted by the drum and dropped onto the working rollers. Otherwise stated, the rollers are always turning in the right direction to do their work under the continuous motion of the drum in one direction. Without these reversings the working rollers would half the time be turning in the wrong direction in respect to each other to do any work. By the drive above described we have provided a very simple and efficient means for driving the said working rollers with the reversings required for the continuous working action of the said rollers.

It must be obvious, of course, that so far as the broad features of driving the working rollers with two reversings in each revolution of the drum the only essential elements are the pinions 14 on the drum-shafts, a pair of gears carried by the drum, and a fixed rack with which the said gears may engage in succession under the rotary motion of the drum. The addition of the pinions 17 on the same hub with the gear members 16 for engagement with the rack 22 is a convenience for securing the desired speed to the working rollers, and the addition of the shipper-head with the gears mounted to slide on the stud-shafts carried by the drum is a further convenience for throwing the working rollers into and out of gear with respect to the rack 22 at will. Some device for throwing the working rollers into and out of action is of course desirable in a machine of this kind, which is first used to churn the cream to separate the butter and then to work the butter. When the machine is used for churning, the working rollers are left in their idle position. When used to work the butter, they are thrown into their operative or driving position. It will also be understood, of course, that the drum might receive its rotary motion in any other suitable way instead of by the means shown and described.

The churning and working actions of a machine of this class are of course well understood, and it is not deemed necessary to detail the same for the purposes of this case.

What we claim, and desire to secure by Letters Patent of the United States, is as follows:

1. In a combined churn and butter-worker, a rotary drum or shell having a pair of butter-working rollers provided with operating-gearing and located respectively at equidistant points on opposite sides of the drum's axis and geared to turn together to work the butter between them, in combination with a single fixed segmental rack adapted to be successively engaged by the operating-gearing of each roller and from which said rollers are alternately driven in reverse directions in succession under the continuous rotation of the drum, whereby said working rollers reversing twice in each revolution of the drum will always turn toward each other at their upper or butter-working surfaces.

2. In a combined churn and butter-worker, the combination with a rotary drum having a pair of working rollers therein, with their shafts extended, at one end, through the drum-head, of a reversing-drive for said rollers comprising intermeshed pinions on said projecting shafts, a pair of gears carried by the drum, one engaged by each of said pinions, and a fixed segmental rack adapted to be engaged by said gears, in succession, under the rotary motion of the drum, substantially as described.

3. In a combined churn and butter-worker, the combination with a rotary drum having therein a pair of working rollers, with their shafts extended, at one end, through the drum-head, of a reversing-drive for said rollers comprising a pair of pinions, one on each of said roller-shafts, a pair of gears carried by the drum one engaging each of said pinions, a fixed segmental rack adapted to be engaged, in succession, by said gears, under the rotary motion of the drum, and a shipper-head applied to said gears for shifting the same lengthwise of their supporting-shafts to throw the same in and out of gear in respect to said rack, substantially as described.

4. The combination with the rotary drum having a hollow trunnion, of the pair of working rollers inside the drum having their shafts, at one end, extended through the drum-head, the pair of pinions 14, one on each of said roller-shafts, the pair of double gears mounted for rotary and sliding movement on the stud-shafts 18 projecting from the drum-head, on opposite sides of the drum's axis, with the large members 16 of said double gears constantly in mesh one with each of said pinions 14, the fixed segmental rack 22 adapted to be engaged, in succession, by the small members 17 of said double gears, under the rotary motion of the drum, the shipper-head 19 engaging the hubs of said double gears and having the central stem 20 extending outward through the hollow trunnions of the drum, and the hand-lever 21 applied to said stem, all for coöperation, substantially as described.

In testimony whereof we affix our signatures in presence of two witnesses.

DENNIS E. VIRTUE.
MARTIN DEEG.

Witnesses:
E. W. RICHTER,
J. A. SOPER.